United States Patent [19]

Pitsch

[11] Patent Number: 4,757,728
[45] Date of Patent: Jul. 19, 1988

[54] ALL-WHEEL LIMITED SLIP DIFFERENTIAL SYSTEM IN THE POWER TRAIN OF A MOTOR VEHICLE

[75] Inventor: Hermann Pitsch, Wimsheim, Fed. Rep. of Germany

[73] Assignee: Dr. Ing. h.c.F. Porsche Aktiengesellschaft, Stuttgart, Fed. Rep. of Germany

[21] Appl. No.: 14,858

[22] Filed: Feb. 13, 1987

[30] Foreign Application Priority Data

Aug. 29, 1986 [DE] Fed. Rep. of Germany ....... 3629493

[51] Int. Cl.⁴ .......................... F16H 1/44; F16H 1/42
[52] U.S. Cl. ........................................ 74/711; 74/714; 74/688; 180/248
[58] Field of Search ...................... 74/790, 791, 710.5, 74/711, 714, 720, 720.5, 803; 180/248, 249

[56] References Cited

U.S. PATENT DOCUMENTS

| | | | |
|---|---|---|---|
| 2,368,873 | 2/1945 | Pollard | 74/720 X |
| 3,374,692 | 10/1964 | Kitch et al. | 74/688 |
| 3,705,522 | 12/1972 | Ogawa | 74/803 |
| 3,828,877 | 8/1974 | Fogelberg | 180/249 |
| 4,347,763 | 9/1982 | Sakakibara et al. | 74/688 X |
| 4,520,691 | 6/1985 | Rodler, Jr. | 74/790 |
| 4,601,359 | 7/1986 | Weismann et al. | 180/248 X |

Primary Examiner—Dirk Wright
Attorney, Agent, or Firm—Barnes & Thornburg

[57] ABSTRACT

An all-wheel limited slip differential system in the power train of the front axle and the rear axle of a motor vehicle has an intermediate planetary transmission in the direct through drive and a clutching device engageable at its planetary carrier. The planetary transmission includes an inlet ring gear that is torsionally fixed with respect to the drive shaft, and an outlet ring gear having a slightly smaller number of teeth that is disposed coaxial and adjacent to the inlet ring gear and is torsionally fixed with respect to an output shaft. The planetary transmission also has several planetary wheels engaging jointly with both ring gears, the planetary wheels connected to planetary carrier and rotating together with it.

11 Claims, 6 Drawing Sheets

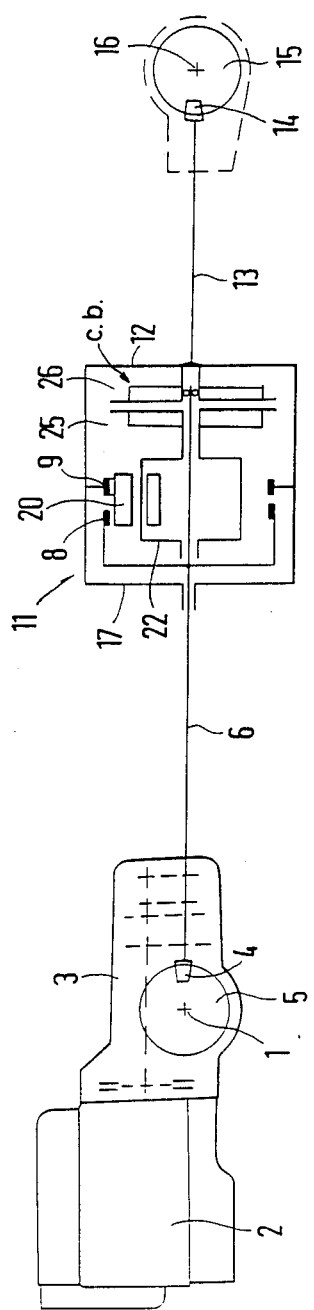

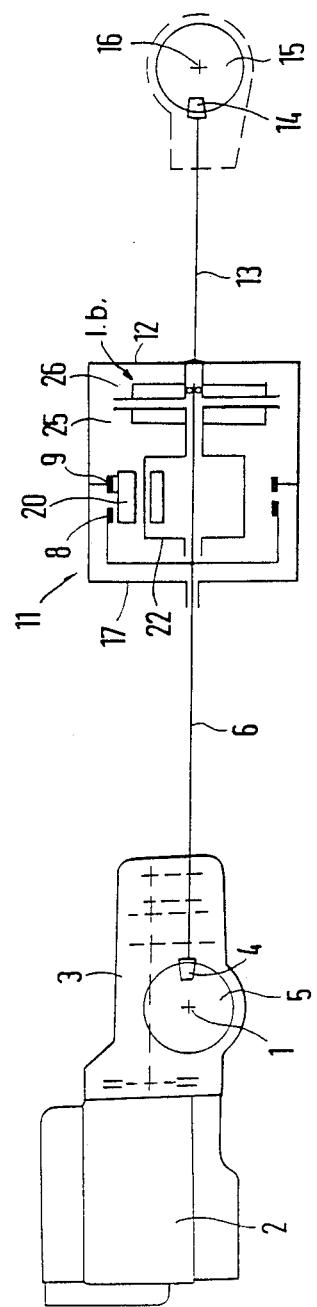

ALL-WHEEL LIMITED SLIP DIFFERENTIAL SYSTEM IN THE POWER TRAIN OF A MOTOR VEHICLE

BACKGROUND AND SUMMARY OF THE INVENTION

The present invention relates to an all-wheel drive for a motor vehicle, having a first axle that can be driven continuously by the vehicle engine or its gear shift transmission and an automatically operating limited slip differential system. This differential system has a planetary transmission formed of sun gear wheels, planetary wheels and a planetary carrier that has a drive through ratio which only slightly deviates from 1:1. The system also has a clutching device which is applied to the planetary transmission at a high ratio.

A limited slip differential system of the above type is described in German Patent No. 35 07 490, corresponding to commonly-owned U.S. patent application Ser. No. 835,381 filed on Mar. 3, 1986. The planetary transmission in that application comprises an inlet sun gear wheel connected with the driving axle, an outlet sun gear wheel having a slightly smaller number of teeth that is arranged coaxial and adjacent to said inlet sun gear wheel and is connected with the axle to be driven, and planetary wheels that are simultaneously engaging with both sun gear wheels and are disposed at a planetary carrier. Bearing bolts are mounted at the planetary carrier on which, as the clutching members, brake shoes are disposed which act as centrifugal weights when the planetary carrier turns and with their braking surfaces place themselves against a fixed brake drum serving as the counterclutching member. Since the outlet sun gear wheel has one or two teeth less than the inlet sun gear wheel, the planetary carrier that has a gear ratio of, for example, 16:1 to the sun gear wheels, rotates continuously, even when the front axle and the rear axle run synchronously so that the limited slip differential system continuously results in a power loss, even if it is slight. When, for example, the inlet sun gear wheel has a number of teeth $Z=32$, the outlet sun gear wheel has $Z=30$ teeth, the gear ratio of the planetary carrier to the sun gear wheels will be 16:1. The minimum constructive size of the limited slip differential system is determined by the outer diameter of the sun gear wheels that is required in order to place 32 sufficiently stable teeth on it.

It is an objective of the present invention to provide a limited slip differential system of the above type having the same stability values, yet requiring less space.

This and other objectives are achieved by the present invention by providing in an all-wheel limited slip differential system having an intermediate planetary transmission in the direct through drive, a clutching device engageable at a planetary carrier, with the planetary transmission having an inlet ring gear that is torsionally fixed with respect to the drive shaft. The planetary transmission also has an outlet ring gear with a slightly different number of teeth, and which is coaxial and adjacent to the inlet ring gear, and is torsionally fixed with respect to an output shaft. Planetary wheels engage jointly with both ring gears and are connected to the planetary carrier and rotate together with the planetary carrier.

In the present invention, instead of two sun gear wheels, two ring gear wheels are used that have a slightly differing number of teeth and are disposed next to one another, with which the planetary wheels of a planetary carrier engage at which the clutching device engages. If it is assumed that the teeth circumference at the ring gear wheels is just as large as it would be in the case of the sun gear wheels, the radial dimension for this limited slip differential system would be much smaller because the planetary wheels from the direction of the teeth circumference are arranged radially toward the inside. Because of the smaller diameters of the wheel set of the planetary carrier, its centrifugal mass becomes less so that a better response behavior of the limited slip differential system is achieved and an unbalanced mass in the wheel set will not have as negative an effect.

If a clutching member that is connected with the planetary carrier interacts with a counterclutching member that, in a torsionally fixed manner, is connected with the power train of the front axle and the rear axle, when these run synchronously, the whole limited slip differential system rotates along with them, and the planetary carrier in this case does not carry out a relative rotation. As a result, no restraining moment and no power loss is created. A braking limited slip moment will not be produced before the rotating speeds of the front axle and the rear axle differ because only then will a relative movement between the clutch member and the counterclutching member be generated. For this reason, the angle drive ratios to the front axle and rear axle may also be the same.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration of an all-wheel power system of a motor vehicle;

FIGS. 1a–d are schematic illustrations of alternate embodiments of an all-wheel power system similar to that of FIG. 1, but with different clutch devices;

DETAILED DESCRIPTION OF THE DRAWINGS

Figure 2:
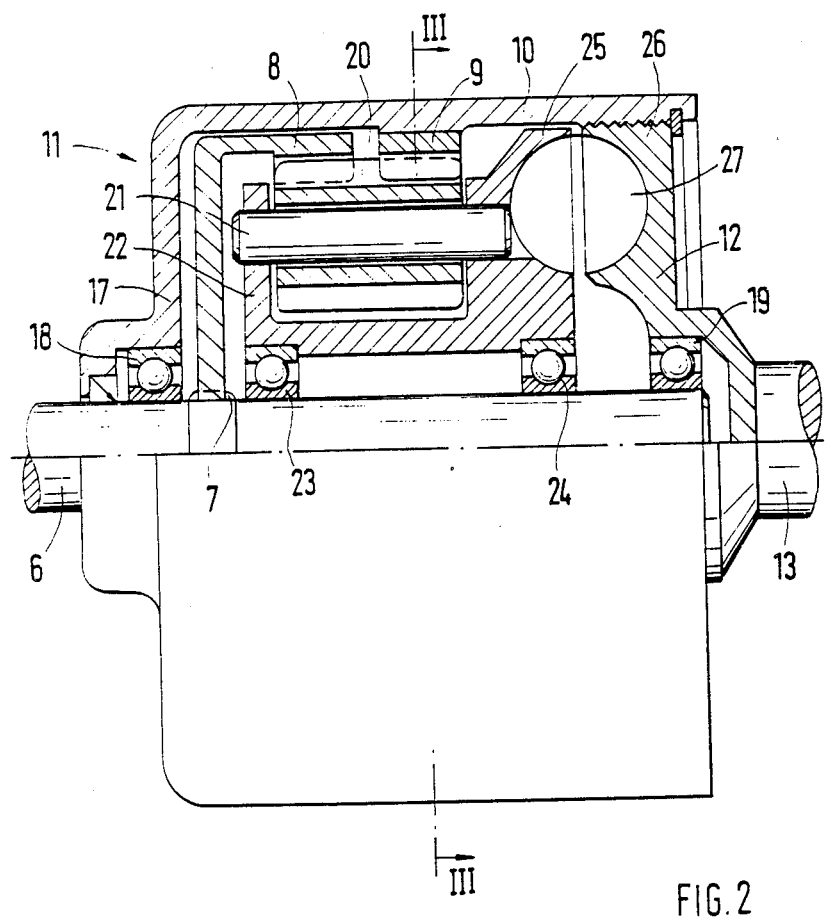
FIG. 2 is a longitudinal section through a preferred embodiment of the limited slip differential system.

A driving motor 2 arranged near the front axle 1 on a motor vehicle drives the front axle 1 by means of a gear shift transmission 3 mounted onto the motor 2, via a bevel gear 4 and a plate gear wheel 5. From the bevel gear 4, a drive shaft 6 leads to an inlet ring gear 8 of a planetary transmission that is fastened on the shaft 6 by means of a serration toothing 7 (FIG. 2). The inlet ring gear 8 is provided with an internal toothing.

An outlet ring gear 9 is adjacent and coaxial to the inlet ring gear 8. As seen in FIG. 2, the outlet ring gear 7, in a bearing surface, is pressed in at the shell 10 of a housing 11 which tightly encloses the limited slip differential system. From the right front side 12 of the housing 11, an output shaft 13 extends that, via a bevel gear 14 and a plate gear wheel 15, drives the rear axle 16 of the motor vehicle. Coaxially with the output shaft 13, the drive shaft 6 extends through the left front side 17 of the housing 11. The drive shaft 6 is disposed in bearings 18 and 19 in the left front side 17 and the right front side 12, respectively, of the housing 11.

Figure 3:
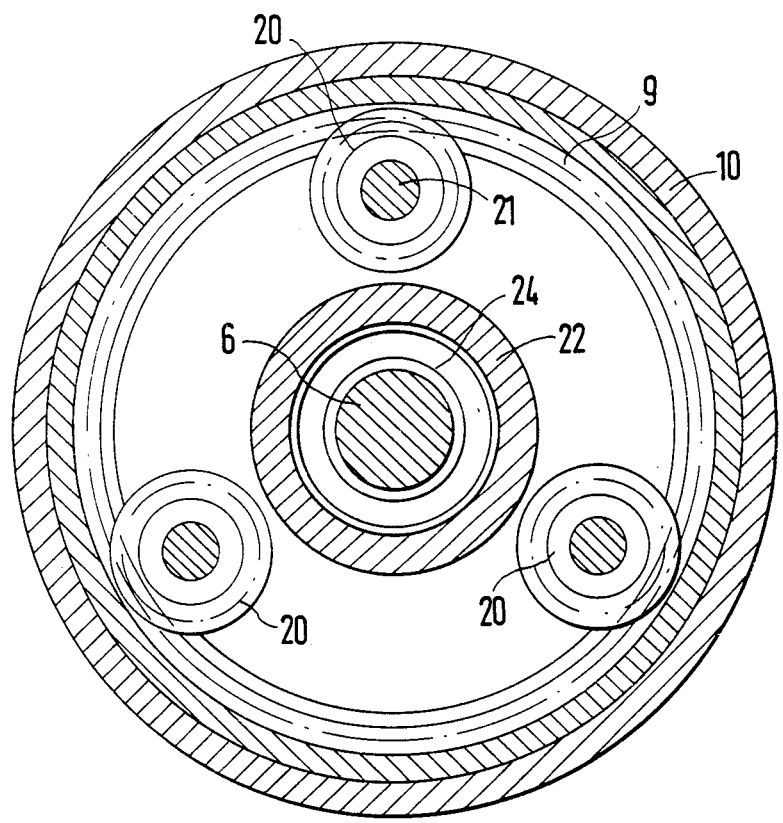
FIG. 3 is a cross-section according to the Line III—III of FIG. 2.

Three planetary wheels 20 (as shown in FIG. 3) engage jointly with the inlet ring gear 8 and the outlet ring gear 9, these planetary wheels 20 being arranged symmetrically at the circumference of the ring gears 8, 9. The planetary wheels 20 are disposed on bearing bolts 21 that are pressed into a U-shaped planetary carrier 22. In bearings 23 and 24, the planetary carrier 22 is disposed on the output shaft. A clutching member 25, that in a preferred embodiment is a bladed half-shell, is shaped onto the planetary carrier 22, this clutching member 25 forming one-half of a hydrodynamic clutch. A second bladed half-shell acts as a counterclutching member 26 and is constructed in one piece with the right side 12 of the housing 11 and is centered and fastened in the shell 10 of the housing 11. Both half-shells together form a torus-shaped flow space 27 that is filled with hydraulic fluid and that, when the half-shells turn relative to one another, because of the transverse force of the fluid, transmits a corresponding restraining moment.

Figure 1B:
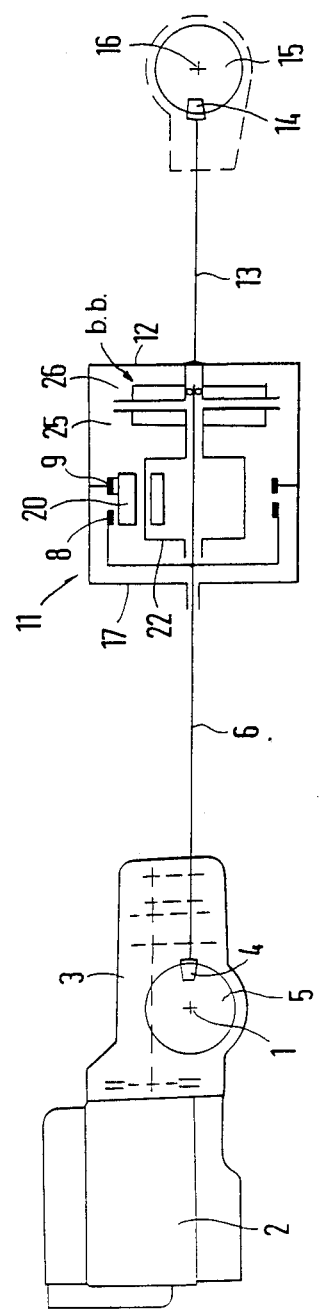
Figure 1C:
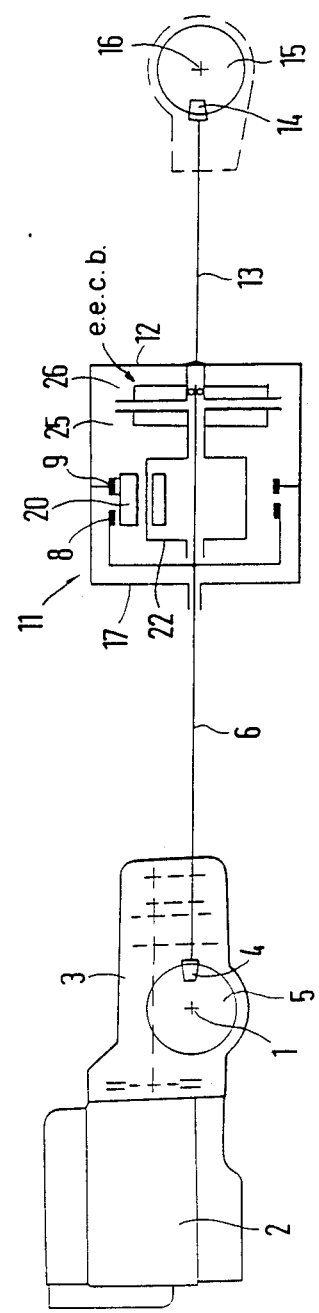

In FIG. 1a, the brake is schematically depicted as a centrifugal clutch (c.b.); in FIG. 1b, as a band clutch (b.b.); in FIG. 1c, as an electrical eddy current clutch (e.e.c.b.); and in FIG. 1d, as a lamella brake (l.b.).

In the preferred embodiment, the inlet ring gear 8 has a number of teeth $Z=54$; the outlet ring gear 9 has a number of teeth $Z=51$, so that the ratio for the direct through drive is 54:51. The gear ratio to the planetary carrier 22 is 18:1. If a rotational speed difference occurs between the front axle 1 and the rear axle and thus an identically large rotational speed difference between the drive shaft 6 and the output shaft 10, the planetary carrier 22 rotates at 18 times that rotational speed difference. By means of the relative rotation of the clutching member to the counterclutching member, a restraining moment is built up that corresponds to the rotational speed difference and causes a synchronous movement of the front axle 1 and the rear axle 16. However, when there is a synchronous movement of the two axles, there is no restraining moment generated, since the whole limited slip differential system rotates along with the axles. This prevents an unwanted power loss.

Because of the progressively rising hydrodynamic restraining moment, the limited slip moment is kept low when there are low slip values. The motor vehicle is easily steerable and an ABS system is fully operable. When there are high slip values, which occur, for example, when the wheels of the front axle 1 spin on ice and the wheels of the rear axle 13 are on a nonskid asphalt, the limited slip moment rises steeply and in this extreme case makes possible a problem-free starting.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. An all-wheel limited slip differential system in a power train of a front axle and a rear axle of a motor vehicle, having an intermediate planetary transmission in the direct through drive and a clutching device engageable at its planetary carrier, the gear ratio for a direct through drive deviating slightly from 1:1, but the gear ratio to the clutching device being significantly higher, the planetary transmission comprising:
   an inlet ring gear that is torsionally fixed with respect to a drive shaft;
   an outlet ring gear having a slightly different number of teeth that is coaxial and adjacent to said inlet ring gear and is torsionally fixed with respect to an output shaft; and
   at least one planetary wheel that engages jointly with both ring gears, and is connected to the planetary carrier and rotates together with said planetary carrier.

2. A limited slip differential system according to claim 1, wherein the clutching device comprises a clutching member that is connected in a torsionally fixed manner with the planetary carrier; and a counterclutching member interacting with said clutching member, said counterclutching member being connected with the output shaft connected to the rear axle in a torsionally fixed manner.

3. A limited slip differential system according to claim 2, said system including a housing for tightly enclosing said system, said housing comprising a cylindrical shell and two flat front sides, the output shaft being mounted on the outside of said housing at one of said front sides.

4. A limited slip differential system according to claim 3, wherein the counterclutching member and the outlet ring gear are fixedly mounted in the housing.

5. A limited slip differential system according to claim 3, wherein the front sides of the housing have bearing means for bearing a central drive shaft that is coaxial with the output shaft, the clutching member and the planetary carrier being disposed on said drive shaft.

6. A limited slip differential system according to claim 2, wherein the clutching member and the counterclutching member form a hydrodynamic clutch.

7. A limited slip differential system according to claim 6, wherein the clutching member and the counterclutching member are developed as bladed half-shells that enclose an oil-filled torus-shaped flow space.

8. A limited slip differential system according to claim 1, wherein the clutching member and the counterclutching member form a centrifugal clutch.

9. A limited slip differential system accordig to claim 1, wherein the clutching member and the counterclutching member form an electrical eddy current clutch.

10. A limited slip differential system according to claim 1, wherein the clutching member and the counterclutching member form a band clutch.

11. A limited slip differential system according to claim 1, wherein the clutching member and the counterclutching member form a lamella brake.

* * * * *